US 8,315,911 B2

(12) United States Patent
Callow et al.

(10) Patent No.: US 8,315,911 B2
(45) Date of Patent: Nov. 20, 2012

(54) MORTGAGE AND REAL ESTATE DATA INTEGRATION AND PRESENTATION SYSTEM

(75) Inventors: Todd Andrew Callow, Los Gatos, CA (US); Sumeet Bhatia, Los Angeles, CA (US); Duke Tsao-Ming Fan, San Jose, CA (US); David Kramer, Wylie, TX (US); Bruce Mitchell, San Francisco, CA (US); Vaughan Allan Smith, Menlo Park, CA (US); Susan Stewart, San Jose, CA (US); Clifton Ray Williams, Sunnyvale, CA (US)

(73) Assignee: Move, Inc., Westlake Village, CA (US)

( * ) Notice: Subject to any disclaimer, the term of this patent is extended or adjusted under 35 U.S.C. 154(b) by 483 days.

(21) Appl. No.: 12/553,456

(22) Filed: Sep. 3, 2009

(65) Prior Publication Data
US 2010/0145825 A1   Jun. 10, 2010

Related U.S. Application Data

(60) Provisional application No. 61/093,878, filed on Sep. 3, 2008.

(51) Int. Cl.
*G06Q 30/00* (2012.01)
(52) U.S. Cl. ........... 705/26.1; 705/300; 705/38; 705/35; 705/36 R; 705/14.4
(58) Field of Classification Search ................. 705/14.4, 705/26.1, 35.36 R, 38, 300
See application file for complete search history.

(56) References Cited

U.S. PATENT DOCUMENTS

| | | | |
|---|---|---|---|
| 7,152,037 B2 | 12/2006 | Smith | |
| 7,558,748 B2 | 7/2009 | Ehring et al. | |
| 7,725,359 B1 | 5/2010 | Katzfey et al. | |
| 7,792,722 B2 | 9/2010 | Joye et al. | |
| 2003/0083895 A1 | 5/2003 | Wright et al. | |
| 2003/0083957 A1* | 5/2003 | Olefson | 705/27 |
| 2003/0144949 A1 | 7/2003 | Blanch | |
| 2003/0212628 A1* | 11/2003 | Kuttan et al. | 705/38 |
| 2004/0128229 A1 | 7/2004 | Raines et al. | |
| 2004/0143450 A1 | 7/2004 | Vidali | |
| 2004/0249705 A1 | 12/2004 | Spencer et al. | |
| 2004/0254819 A1* | 12/2004 | Halim et al. | 705/5 |
| 2005/0080702 A1* | 4/2005 | Modi | 705/36 |
| 2005/0288955 A1 | 12/2005 | Lewiss-Hachmeister | |
| 2006/0015423 A1 | 1/2006 | Ballenger | |
| 2006/0020531 A1 | 1/2006 | Veenemann et al. | |
| 2006/0149664 A1 | 7/2006 | Smyth et al. | |
| 2006/0271458 A1 | 11/2006 | Arnold, III et al. | |

(Continued)

*Primary Examiner* — Yogesh C Garg
(74) *Attorney, Agent, or Firm* — Alston & Bird LLP

(57) ABSTRACT

A method of presenting real estate data is provided. A plurality of property listings can be presented, and a selection of one of the presented property listings may be received from a user. The user may be associated with a financial profile, which may be specified via user input. In response to receiving the selection by the user, at least one loan offer corresponding to the property listing may be automatically presented, for example, together with the property listing. The loan offer may be at least partially based on the financial profile, and may also be based on a property corresponding to the selected property listing. For example, the property listing and the financial profile may be automatically transmitted to one or more loan providers in response to receiving the selection by the user of the property listing, and in response loan offers may be received from some of the loan providers.

18 Claims, 17 Drawing Sheets

U.S. PATENT DOCUMENTS

2008/0010178 A1 1/2008 Savard
2008/0109349 A1 5/2008 Jenich et al.
2008/0120596 A1 5/2008 Kothari et al.
2008/0243569 A1 10/2008 Hadden
2009/0106135 A1 4/2009 Steiger
2009/0177576 A1 7/2009 Cugliari
2009/0307088 A1 12/2009 Littlejohn
2010/0185563 A1 7/2010 Wyckoff

* cited by examiner

200

| Sort results by | | | |
|---|---|---|---|
| Number of Photos | Price | Featured Tour | Percent Match ▼ |

$19,900  Charlotte, NC 28269
2 Bed, 1 Bath
0.43 Acres

100% Match 204, 204a

⊞ Save this Listing

Property Type: Single Family Home
Single Family Property, Area: AREA 1, County: Mecklenburg, Approximately 0.43 acre(s), Year Built: 1958, Single story, Dining room ... View details

203

$19,900  Charlotte, NC 28208
4 Bed, 1 Bath
0.2 Acres

100% Match

204

⊞ Save this Listing

Property Type: Single Family Home
Single Family Property, Area: AREA 8, Subdivision: Reid Park, County: Mecklenburg, Approximately 0.2 acre(s), Year Built: 1941, Single ... View details

203

$19,900  Charlotte, NC 28278
2 Bed, 1 Bath
0.2 Acres

100% Match

204

⊞ Save this Listing

Property Type: Single Family Home
Single Family Property, Area: AREA 7, Subdivision: Lake Wylie, County: Mecklenburg, Approximately 0.29 acre(s), Year Built: 1920, Single ... View details

| Loan Details | My Finances |
|---|---|
| Purchase Price | Annual Income |
| $325,000 | $50,000 |
| Down Payment | Credit Score |
| 20% $32,500 | good 680 |
| 0%            100% | bad        excellent |
| Loan Amount | Assets |
| $292,500 | $100,000 |
| Points | Debt Payments |
| 0 Points ▼ | |
| Loan Type | Lender Preferences |
| ☑ 30 Year Fixed | |
| ☐ 15 Year Fixed | |
| ☐ 10 Year Fixed | |
| ☐ 7/1 ARM | |
| ☑ 5/1 ARM | |
| ☐ 3/1 ARM | |
| More loan types | |

FIG. 6

| Sort results by | | | |
|---|---|---|---|
| Number of Photos | Price | Featured Tour | Percent Match ▼ |

$19,900  Charlotte, NC 28269    100% Match
2 Bed, 1 Bath
0.43 Acres 304, 304a ⊞ Save this Listing   Property Type: Single Family Home
Single Family Property, Area: AREA 1, County: Mecklenburg, Approximately 0.43 acre(s), Year Built: 1958, Single story, Dining room ... View details $19,900  Charlotte, NC 28208    100% Match
4 Bed, 1 Bath
0.2 Acres

304

⊞ Save this Listing   Property Type: Single Family Home
Single Family Property, Area: AREA 8, Subdivision: Reid Park, County: Mecklenburg, Approximately 0.2 acre(s), Year Built: 1941, Single ... View details $19,900  Charlotte, NC 28278    100% Match
2 Bed, 1 Bath
0.2 Acres

304

⊞ Save this Listing   Property Type: Single Family Home
Single Family Property, Area: AREA 7, Subdivision: Lake Wylie, County: Mecklenburg, Approximately 0.29 acre(s), Year Built: 1920, Single ... View details

| Sort results by | | | |
|---|---|---|---|
| Number of Photos | Price | Featured Tour | Percent Match ▼ |

$31,300  Charlotte, NC 28205    100% Match
4 Bed, 2 Bath
0.35 Acres                       320

⊞ Save this Listing    Property Type: Single Family Home
Single Family Property, Area: AREA 4, Subdivision: Greir Heights, County: Mecklenburg, Approximately 0.35 acre(s), Year Built: 2005, Single ... View details $31,500  Charlotte, NC 28213    100% Match
3 Bed, 1 Bath
0.11 Acres                       320                        318

⊞ Save this Listing    Property Type: Single Family Home
Single Family Property, Area: AREA 1, County: Mecklenburg, Approximately 0.11 acre(s), Year Built: 2000, Single story, Central air conditioning, ...View details.

$32,500  Charlotte, NC 28208    100% Match
3 Bed, 1 Bath
                                 320

⊞ Save this Listing    Property Type: Single Family Home
Single Family Property, Area: AREA 8, County Mecklenburg, Year Built: 1946, Single story, Fireplace(s), Den, Laundry room, Hardwood ... View details

*FIG. 8C*

|  |  | Payment | Rate | APR ▼ | Closing |  |  |
|---|---|---|---|---|---|---|---|
| Downey Savings | 30 Year Fixed | $1,754 | 6.000% | 6.043% | $3,000 | (Compare) | (Contact) |
| Countrywide | 30 Year Fixed | $1,777 | 6.125% | 6.168% | $1,140 | (Compare) | (Contact) |
| Chase | 5/1 ARM | $1,793 | 6.250% | 6.290% | $3,250 | (Compare) | (Contact) |
| Wells Fargo | 5/1 ARM | $1,801 | 6.250% | 6.293% | $670 | (Compare) | (Contact) |
| Downey Savings | 30 Year Fixed | $1,754 | 6.000% | 6.043% | $3,000 | (Compare) | (Contact) |
| Countrywide | 30 Year Fixed | $1,777 | 6.125% | 6.168% | $1,140 | (Compare) | (Contact) |
| Chase | 5/1 ARM | $1,793 | 6.250% | 6.290% | $3,250 | (Compare) | (Contact) |

Listing details:
$19,900 — Charlotte, NC 28269
2 Bed, 1 Bath
0.43 Acres
404a

⊞ Save this Listing

Property Type: Single Family Home
Single Family Property, Area: AREA 1, County: Mecklenburg, Approximately 0.43 acre(s), Year Built: 1958, Single story, Dining room ... View details.

440 — ADD AN OFFER 406, 406, 406

| Lender | WELLS FARGO |
| Type | 5/1 ARM |
| Payment | 5/1 ARM |
| Rate | 6.25 |
| APR | 6.293 |
| Closing | 670 |

Downey Savings
30 Yr Fixed

Payment $1754    RATE 6.000
Closing $3000    APR 6.043

CONTACT INFO  800-555-1234

NOTES

Mortgage Contingent On Sale Of
Current Home

QUESTIONS

1) What is the Charge for Points and After
What Time will Paying Points
Make Sense?

Response Notes:

FIG. 15

MORTGAGE AND REAL ESTATE DATA INTEGRATION AND PRESENTATION SYSTEM

CROSS-REFERENCE TO RELATED APPLICATIONS

The present application claims the benefit of U.S. Provisional Patent Application No. 61/093,878 filed on Sep. 3, 2008, the content of which is incorporated herein by reference in its entirety.

FIELD OF APPLICATION

Embodiments of the present invention relate generally to systems, methods, and computer program products for managing real estate data, and more particularly to systems, methods, and computer program products for managing and presenting mortgage and real estate data.

BACKGROUND

The process of purchasing a new home often includes the independent steps of locating a property for potential purchase and securing financing for the purchase of the located property. Potential purchasers may look to a variety of different resources to gather information regarding properties, neighborhoods, and lenders; and gathering the information necessary to make an informed purchase and selection in a loan provider can be time consuming. Further, in order to get a realistic understanding of the financial products offered by various loan providers a customer may have to repeatedly provide a significant amount of personal financial information, which can again be quite time consuming.

SUMMARY

In one aspect, a method of presenting real estate data is provided. Provided in other aspects are a computer-readable storage medium that stores computer-readable instructions that, when executed by a computer, cause the computer to carry out the method; and an apparatus including a processing unit configured to execute the method. The method includes presenting a plurality of property listings that correspond to properties that may or may not be for sale. A selection of one of the presented property listings (whether or not the property represented by the listing is for sale) may be received from a user. The user may be associated with a financial profile, which may be specified via user input.

In response to receiving the selection by the user, at least one loan offer corresponding to the property listing may be automatically presented, for example, together with the property listing. The loan offer may be at least partially based on the financial profile, and may also be based on the property corresponding to the selected property listing. The property listing and the financial profile may be automatically transmitted to one or more loan providers in response to receiving the selection by the user of the property listing, and in response, loan offers may be received from some of the loan providers.

In some embodiments, an indication of financial terms for loans selected by others having similar financial profiles to the financial profile associated with the user may be presented. In other embodiments, an extent to which aspects of the financial profile surpass minimum requirements associated with the loan offer may be automatically indicated. For example, an extent to which an aspect selected from the group consisting of loan-to-value ratio, debt-to-income ratio, and credit rating surpasses corresponding minimum requirements associated with the loan offer may be automatically indicated. Similarly, a specific aspect of the financial profile that is relatively closest to a corresponding minimum requirement associated with the loan offer may be indicated.

In another aspect, a method of presenting real estate data is provided. Provided in other aspects are a computer-readable storage medium that stores computer-readable instructions that, when executed by a computer, cause the computer to carry out the method; and an apparatus including a processing unit configured to execute the method. The method includes presenting a plurality of property listings and receiving a selection by a user of a property listing of the plurality of property listings. Mortgage terms, including, for example, a monthly payment, may be determined for the selected property listing, for example, after user specification of acceptable financial terms. A user indication of satisfaction with or disapproval of the determined mortgage terms may be received. One or more additional property listings can then be automatically presented based at least on the mortgage terms determined for the selected property listing, and also possible on the user indication of satisfaction of disapproval of the determined mortgage terms.

In yet another aspect, a method of presenting real estate data is provided. Provided in other aspects are a computer-readable storage medium that stores computer-readable instructions that, when executed by a computer, cause the computer to carry out the method; and an apparatus including a processing unit configured to execute the method. The method includes presenting a property listing and presenting a slider bar respectively corresponding to a value for one or more of the items selected from the group consisting of a credit score, a preferred down payment amount, an income amount, and an outstanding debt amount. An adjustment by a user of the slider bar may be received, and a mortgage scenario regarding the presented property listing may be automatically presented in response to the received adjustment. The mortgage scenario may be automatically obtained from a loan provider, or may be automatically retrieved from a lookup table.

In still another aspect, a method of presenting mortgage scenarios is provided. Provided in other aspects are a computer-readable storage medium that stores computer-readable instructions that, when executed by a computer, cause the computer to carry out the method; and an apparatus including a processing unit configured to execute the method. The method includes receiving from a user financial terms corresponding to a first mortgage scenario regarding a property listing. A second mortgage scenario regarding the property listing may be automatically obtained, and the first and second mortgage scenarios may be presented together in order to allow comparisons therebetween.

In some embodiments, a plurality of property listings may be presented, and a selection by the user of a property listing may be received. A second mortgage scenario regarding the property listing may be obtained, say, from a loan provider, in response to receiving the selection by the user of the property listing.

In yet another aspect, a method of managing real estate data is provided. Provided in other aspects are a computer-readable storage medium that stores computer-readable instructions that, when executed by a computer, cause the computer to carry out the method; and an apparatus including a processing unit configured to execute the method. The method includes receiving indication from a user of an acceptable mortgage term (e.g., an acceptable maximum monthly payment amount or an acceptable maximum total cost of ownership) and automatically monitoring a financial index or a specific mortgage offer (e.g., mortgage interest rates offered by specific lenders and/or interest rate indices). Specific properties may then be automatically selected from a database of property listings based at least on the indication of the acceptable mortgage term and the monitored financial index or a specific mortgage offer. Current representations of the monitored financial index or specific mortgage offer (e.g., interest rate and required down payment for a monitored specific mortgage offer) may be automatically presented periodically to the user.

In some embodiments, indication from a user of a maximum acceptable monthly mortgage payment amount may be received at a first time. A first set of specific properties may be automatically selected from a database of property listings based at least on the indication of the maximum acceptable monthly mortgage payment amount. A change in the monitored financial index or specific mortgage offer may be detected (possibly automatically), and in response thereto, a second set of specific properties may be automatically selected from the database of property listings based at least on the indication of the maximum acceptable monthly mortgage payment amount and the one or more monitored financial indices. The second set of specific properties can be automatically compared to the first set of specific properties to determine differences therebetween, and a representation of the determined differences between the second set of specific properties to the first set of specific properties can be provided.

In some cases, a financial profile for the user may be obtained, the financial profile including, for example, loan type preferences, user income, user credit score, estimated down payment, and/or intended points to be paid. In other cases, indication of a geographic location may be received from a user, and selection of specific properties from a database of property listings may be based at least on the indication of the geographic location.

In still another aspect, a method of managing mortgage data is provided. Provided in other aspects are a computer-readable storage medium that stores computer-readable instructions that, when executed by a computer, cause the computer to carry out the method; and an apparatus including a processing unit configured to execute the method. The method includes providing a (first) mortgage scenario and automatically providing contact information for a loan provider associated with the mortgage scenario. Topics for further discussion with the loan provider may also be provided automatically with the contact information, the topics being based on the mortgage scenario. Information related to the topics may be received from a user and stored together with the mortgage scenario for subsequent retrieval. In some embodiments, a user may provide financial terms corresponding to a second mortgage scenario regarding a property listing, and the first and second mortgage scenarios may be presented together in order to allow comparisons therebetween.

In yet another aspect, a method of presenting real estate data is provided. Provided in other aspects are a computer-readable storage medium that stores computer-readable instructions that, when executed by a computer, cause the computer to carry out the method; and an apparatus including a processing unit configured to execute the method. The method includes presenting a plurality of property listings and automatically presenting with each listing a respective total cost of ownership for each corresponding listing. Total cost of ownership may include factors such as, for example, home owners association fees, estimated utility bills, Mello-Roos costs, expected maintenance costs, private mortgage insurance costs, and/or transaction costs associated with purchase of each corresponding listing (e.g., escrow amounts, moving costs, and/or move-in costs). Search criteria may be received and a search of a database of property listings may be performed based on the search criteria to determine the plurality of property listings.

In yet another aspect, a method of presenting mortgage scenarios is provided. Provided in other aspects are a computer-readable storage medium that stores computer-readable instructions that, when executed by a computer, cause the computer to carry out the method; and an apparatus including a processing unit configured to execute the method. The method includes graphically presenting together multiple mortgage scenarios (e.g., plotting as a function of time the cumulative cost of each respective mortgage of the multiple mortgage scenarios). Selection of a position (e.g., a time) within the graphically presented multiple mortgage scenarios may be receiving, and in response thereto, financial terms of each of the multiple mortgage scenarios corresponding to the position may be automatically presented. For example, a monthly payment, an amount of interest paid, an amount of equity built, and/or an interest rate corresponding to the selected position can be automatically presented for each mortgage scenario. In some embodiments, user input specifying financial parameters may be received, and the graphical presentation of multiple mortgage scenarios may include a mortgage scenario generated based on the specified financial parameters.

In still another aspect, a method of presenting real estate data is provided. Provided in other aspects are a computer-readable storage medium that stores computer-readable instructions that, when executed by a computer, cause the computer to carry out the method; and an apparatus including a processing unit configured to execute the method. The method includes presenting a plurality of property listings and receiving a selection by a user of a property listing. The user can be associated with a financial profile. In response to receiving the selection by the user, a loan scenario corresponding to the property listing may be automatically presented, the loan scenario having minimum requirements that exceed aspects of the financial profile. The aspects of the financial profile that did not meet the minimum requirements of the loan scenario and the extent to which the minimum requirements exceed the aspects of the financial profile may be presented.

BRIEF DESCRIPTION OF THE SEVERAL VIEWS OF THE DRAWING(S)

Reference will now be made to the accompanying drawings, which are not necessarily drawn to scale.

FIG. 2A is a schematic representation of a listing window configured in accordance with an example embodiment.

FIG. 6 is a schematic representation of a financial profile window configured in accordance with an example embodiment.

FIGS. 8A-8C are schematic representations of outputs provided when selecting a property listing and obtaining additional listings according to an example embodiment.

FIGS. 9 and 11 are schematic representations of a mortgage window configured in accordance with another example embodiment, the mortgage window including an "add an offer" button.

FIG. 10 is a schematic representation of an independent offer window configured in accordance with an example embodiment.

Figure 13:
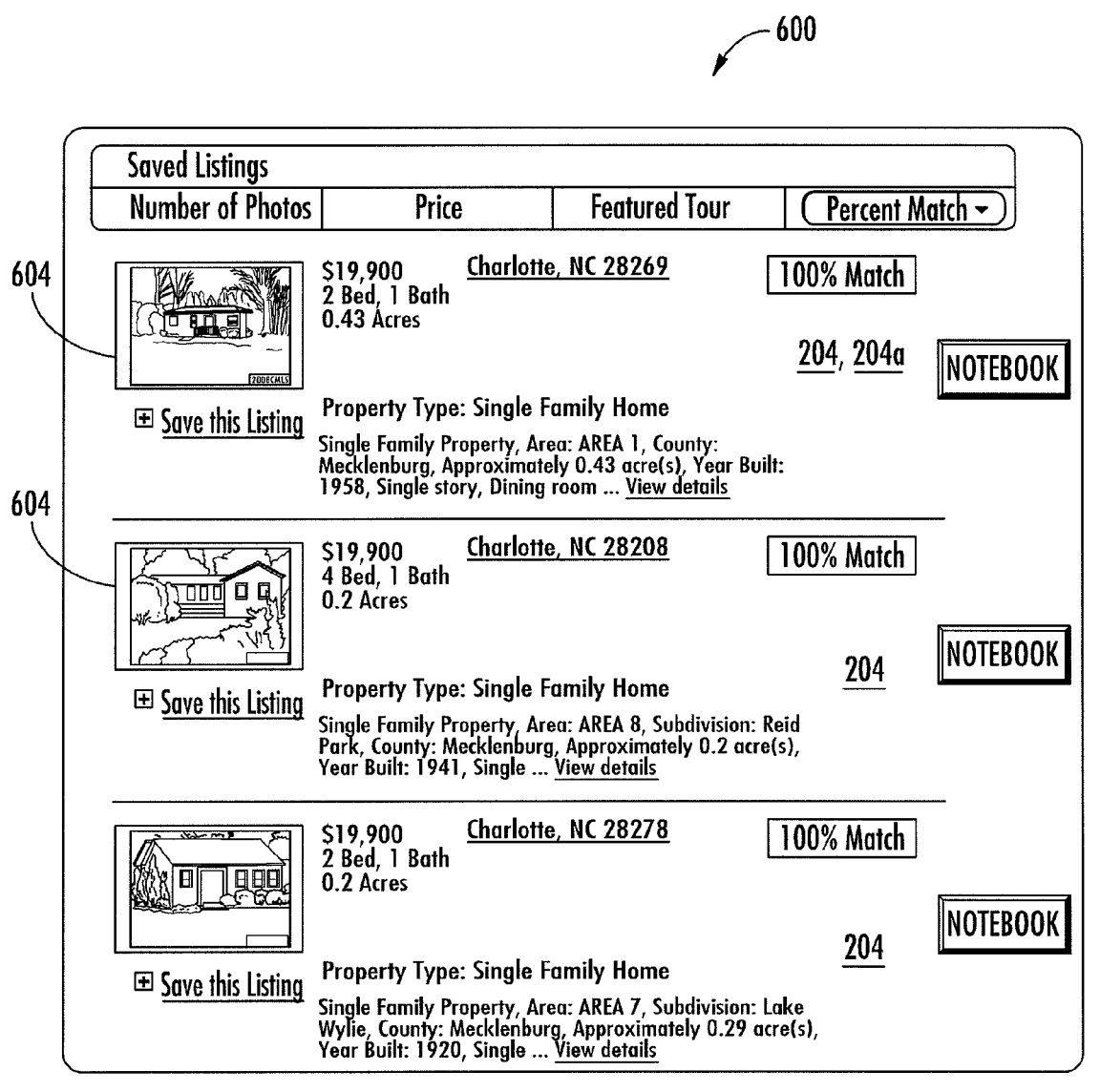

FIG. 13 is a schematic representation of a saved listings window configured in accordance with an example embodiment.

Figure 14:
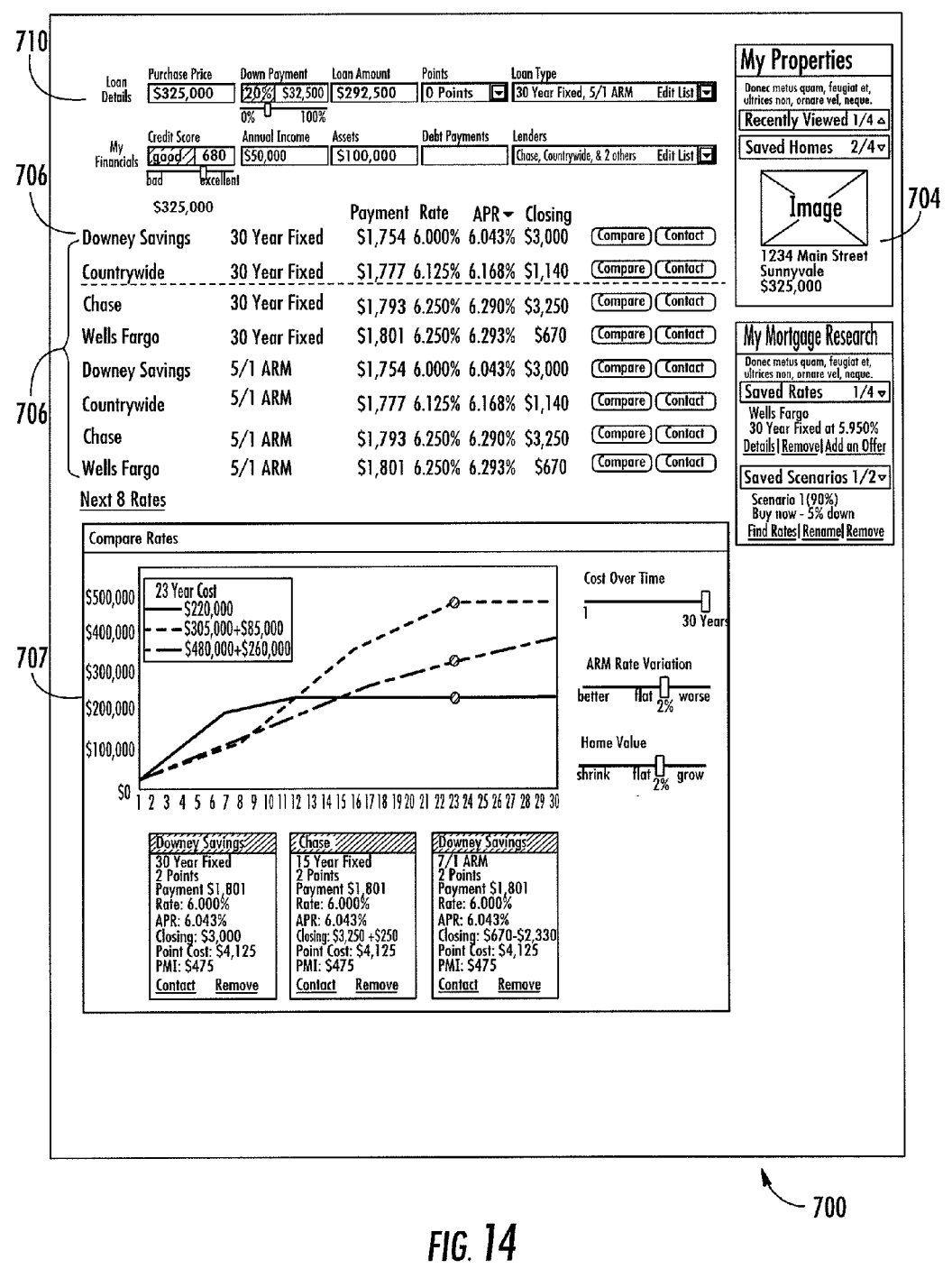

FIG. 14 is a schematic representation of a notebook view configured in accordance with an example embodiment.

FIG. 15 is a schematic representation of a specific offer window configured in accordance with an example embodiment.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present disclosure is generally directed to systems, methods, and computer program products for managing and presenting mortgage and real estate data. Embodiments of such mortgage and real estate data management and presentation (MRDMP) systems, methods, and computer program products can be configured to allow a user to browse a variety of property listings, to select properties of interest from within the group of listed properties, and to then obtain further information regarding the property. In addition, information regarding potential mortgage scenarios may also be provided. The user may enter financial information to create a user profile, which can be used to tailor the mortgage scenarios to the user. Mortgage and property data may be stored together with suggested topics for further investigation, thereby creating a virtual notebook regarding the property and a potential purchase thereof. The systems, methods, and computer program products may use the user profile and associated indications of interests in certain types of mortgages or properties to continuously monitor the market and alert the user of pertinent changes or developments.

Figure 1:
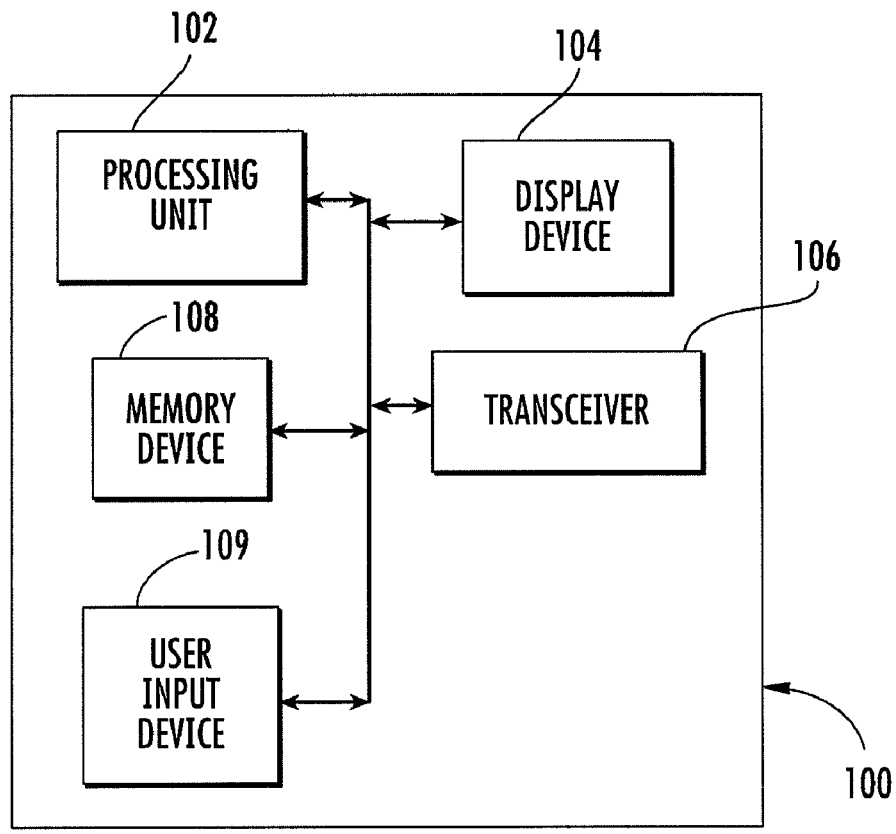
FIG. 1 is a schematic representation of a mortgage and real estate management and presentation (MRDMP) system configured in accordance with an example embodiment.
Figure 3:
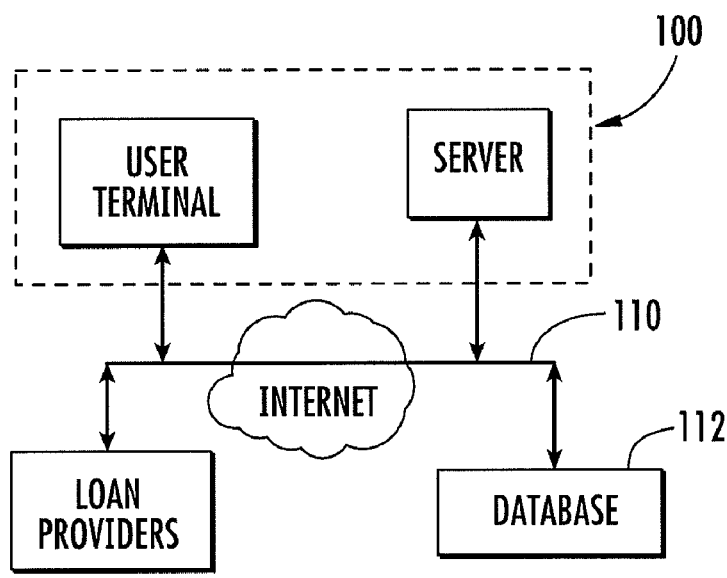
FIG. 3 is a schematic representation of a system including the MRDMP system of FIG. 1, and configured in accordance with an example embodiment.

Referring to FIGS. 1 and 2A, therein are respectively shown a MRDMP system 100 configured in accordance with an example embodiment, and a schematic representation of a graphical output 200 from such a MRDMP system. The MRDMP system 100 can include, for example, a processing unit 102, such as a processor, an application-specific integrated circuit, and/or a collection of analog and/or digital circuitry. In one embodiment, the MRDMP system 100 may include a general purpose computer having a processor configured to execute computer-readable program instructions that may be stored in an associated memory. The MRDMP system 100 may also include a display device 104 in communication with the processing unit 102, which display device may be used to display the graphical output 200 as a graphical user interface. A transceiver 106, such as an Ethernet or a wireless connection, and a memory device 108, such as volatile memory and/or non-volatile memory, may also be included in the MRDMP system 100. The MRDMP system 100 may be located in a single physical location or, as shown in FIG. 3, may be distributed across a network 110 that may include the Internet, so as to employ a server-client relationship between various constituent parts of the system. The MRDMP system 100 may also communicate with (or incorporate) other components, such as a database 112 and one or more loan providers, which are discussed further below.

Figure 2B:
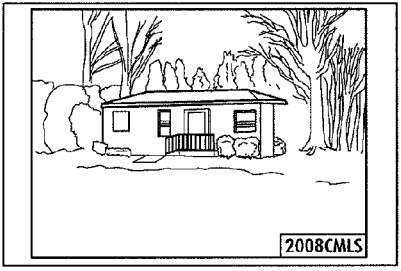
FIG. 2B is a schematic representation of a detailed view window configured in accordance with an example embodiment.

Referring to FIGS. 1, 2A, and 2B, the graphical output 200 may present a listing window 202 that includes plurality of property listings 204. For example, the property listings may correspond to homes for sale and/or undeveloped lots for sale, as well as properties that are not for sale, but for which financial data may be available (e.g., homes for which refinancing may be sought or homes for which information is simply desired). The listings 204 may be returned, for example, in response to a search, initiated by a user, for properties in a given geographic area, price range, and/or property type. The plurality of property listings 204 may be presented as a list, distributed within a map, or in some other manner that allows a user to browse the property listings returned by the search. Each property listing may be associated with descriptive data, such as location, price, and/or total cost of ownership (described below), etc. Some embodiments may resemble listings as commonly presented via traditional real estate web sites, such as Realtor.com.

A user may select one or more of the property listings 204. For example, where the property listings 204 are presented via the display device 104, the user may select a property listing from a list of properties using a user input device 109, such as a pointing device (e.g., a mouse), that is associated with or part of the MRDMP system 100. In response to selecting a property listing, the user may be presented with more details regarding the property to which the selected listing 204a corresponds, for example, in a detailed view window 205, as shown in FIG. 2B. For example, while a user may be presented with only price and location data when browsing properties, selection of a respective property may provide access (e.g., via hyperlink) to more detailed information regarding floor plan, interior design, neighborhood information, itemized costs of ownership, price, lot size, and/or dwelling style, etc., in addition to price and location data.

Figure 4:
FIG. 4 is a schematic representation of a mortgage window configured in accordance with an example embodiment.
Figure 5:
FIG. 5 is a schematic representation of a mortgage and listing window configured in accordance with an example embodiment.

Referring to FIGS. 1-5, in response to receiving the selection by the user of a specific property listing 204a, loan offers/scenarios 206 corresponding to the selected property listing may be automatically presented, for example, in a mortgage window 208 as shown in FIG. 4. The mortgage window 208 may present an overview of the selected listing 204a and any associated offers 206. Alternatively, in some embodiments, loan offers may be respectively presented together with a more detailed description of the selected property listing 204a, for example, in a mortgage and listing window 212, as shown in FIG. 5. The mortgage and listing window 212 may include a listing data portion 214 and a mortgage data portion 216. The listing data portion 214 can contain detailed data regarding the property itself, as discussed above in conjunction with the detailed view window 205.

Whether presented in a mortgage window 208 or the mortgage data portion 216 of a mortgage and listing window 212, the offers 206 may specify information including, for example, the amount of down payment required, the interest rate of the loan, the annual percentage rate, the estimated closing costs associated with the loan, and/or an updated accounting of the total cost of ownership (including, for example, home owners association fees, estimated utility bills, Mello-Roos costs, expected maintenance costs, private mortgage insurance (PMI) costs, principal costs, interest costs, taxes, and/or homeowners insurance), all of which may be automatically determined for each property listing. The total cost of ownership may also include transaction costs associated with purchase of a listed property, such as escrow amounts, moving costs, or move-in costs (e.g., utility deposits). The offers 206 may be presented as generic sample loan offers/scenarios, or may be generated by communicating with loan providers (say, via the network 110) or by accessing databases (e.g., database 112) of existing offers on the market. The loan offers/scenarios 206 can be tailored to the property, for example, by taking into account the listing price and any location-specific factors, such as, for example, local property appreciation trends.

The user of the MRDMP system 100 may be associated with a financial profile. For example, referring to FIG. 6, the user may be prompted to manually enter certain financial (and associated descriptive) information, such as loan type preferences (e.g., fixed or variable rate, duration, etc.), preferred monthly payment amount, user income, user credit score, user assets and debts, user foreclosure and bankruptcy histories, user contact information, estimated down payment, and/or intended points to be paid, mortgage information regarding any existing properties (e.g., loan type, principal, interest, monthly payment amount), via a financial profile window 210. The financial profile window 210 may also accept information regarding the user's financial goals (e.g., quick principal repayment, minimization of monthly payments, fixed payments, etc.).

In some embodiments, the financial profile window 210 may include one or more slider bars 230 or like devices corresponding to respective values for financial parameters (e.g., credit score, a down payment amount, etc.). The user may adjust a respective slider bar 230 in order to specify the value for the associated parameter. Alternatively, the MRDMP system may obtain a financial profile for the user by requesting the profile from another source, such as a bank and/or credit bureau, or by amassing the financial information, for example, through an automated activity, such as web crawling. The user financial profile may be stored, for example, in the memory device 108 or a remote database 112 (FIG. 1), so as to be associated with the user and available for subsequent use.

Figure 7:
FIG. 7 is a schematic representation of a combination mortgage window and financial profile window configured in accordance with an example embodiment.
Figure 8B:

Referring to FIGS. 2A and 7, where the user has selected a property listing 204 (or 204a), the user may be presented with a financial profile window 210 together with a mortgage window 208. The mortgage window 208 may include summary information regarding the listing, possibly along with some default mortgage scenarios. The user may employ the financial profile window 210, including the slider bars 230, to enter financial information. In response to respective adjustments of the slider bars 230, mortgage scenarios 206 corresponding to the values indicated by the slider bars may be automatically presented regarding the selected property listing (i.e., without further action being required by the user, such as activating a "submit" or "enter" button).

Where a financial profile is available, either because it was entered by the user or compiled or obtained by the system, one or more of the loan offers 206 provided upon selection of a listing 204 or 204a may be at least partially based on the information contained in the financial profile. For example, a loan offer to a user may be based on the income level of the user and/or the credit rating of the user; traditionally, for instance, users with higher incomes or better credit ratings have received offers with lower associated interest rates. Loan offers may also depend on other factors aside from those represented in the financial profile, such as the specific property at issue (e.g., its physical location and the financial outlook for the region), general economic indicators and/or outlooks, etc.

The loan offers 206 may be generated automatically, for example, by consulting a table of offers in which the financial profile acts as parameters, which table may be stored, for example, in the memory device 108 (FIG. 1) or in the database 112 (FIG. 3). For example, the user may specify an income and credit score, and these factors may be used to locate within the table the appropriate offer. Alternatively, the selected property listing and the user's financial profile may be transmitted to a loan provider, such as a bank or commercial lender, in response to which the loan provider can provide an offer that is specific to the user and the property. In some embodiments, this transmission may be automatically conducted in response to receiving a selection by the user of a specific property listing. The property listing and user financial profile may be provided to multiple loan providers in order to obtain a plurality of loan offers corresponding to the property listing. In some embodiments, each offer 206 may also be associated with a "contact" button 261 (see FIGS. 4 and 5) that can be activated to obtain the contact information for the loan provider with which the offer originated, thereby facilitating the gathering of further information regarding interesting offers.

In conjunction with the offers 206, the user may be presented with an indication of the types of loans that similarly situated buyers selected. "Similarly situated" buyers would be those with financial profiles that are similar to the financial profile of the user (e.g., similar annual income, similar debt-to-income ratio, etc.). For example, the user could be presented with financial terms most frequently selected by similarly situated buyers, such as a common down payment amount or a frequently selected interest rate for a given type of loan (say, 30 years in duration and fixed interest rate). The user can then leverage this information in making a selection of a loan offer. The information regarding the selections of others could be amassed by the MRDMP system 100 by tracking queries and closed transactions for other users associated with respective financial profiles.

A user of the MRDMP system 100 may also be presented with information indicating the extent to which aspects of the user's financial profile surpass minimum requirements associated with a loan offer (e.g., minimum loan-to-value (LTV) ratio, maximum debt-to-income (DTI) ratio, minimum credit rating, etc.). This can be done in a more general manner, say, by indicating that a user's financial profile makes the user "highly qualified," "moderately qualified," or "barely qualified" for a given loan. Alternatively, a specific aspect of the user's financial profile may be indicated as being closest to a corresponding minimum requirement associated with the loan offer. For example, a loan offer may require a minimum debt-to-income (DTI) ratio of 0.25 and a minimum credit score of 690. A user's financial profile may indicate a DTI ratio of 0.23 (8% above the minimum requirement) and a credit score of 695 (0.7% above the minimum requirement). The user may be informed that the credit score is closest to a minimum requirement of the loan, this information allowing the user to monitor those aspects of the financial profile that are most likely to affect the ability of the user to obtain a loan. As another alternative, the user may be presented with all of the aspects of the financial profile that fall within a certain range of the minimum requirements for a loan (say, within 10%).

Upon selecting a property listing from a plurality of presented property listings, in addition to being presented with one or more loan offers, the user may be presented with one or more loan scenarios for which the user, based on the user's financial profile, would not qualify. That is, the user may be presented with one or more loan scenarios having one or more respective minimum requirements that exceed aspects of the user's financial profile. The user may be informed regarding the extent to which the requirements for a loan scenario exceed a corresponding aspect of the user's financial profile. For example, the user may be informed that their credit score is 10% lower than the minimum required credit score for a certain loan. Further, the user may be told, say, that an increase in down payment amount of $10,000 will result in the availability of a new loan with a lower interest rate.

Referring to FIGS. 1, 6, and 8A-8C, once a user has specified a preference for a property/property type or a financial term or product and has been presented with property listings consistent with those preferences, the MRDMP system 100 may be configured to present to the user additional listings of potential interest. For example, after presenting a plurality of property listings 304 in a listing window 302 and receiving a selection by a user of a specific property listing 304a (see FIG. 8A), mortgage terms 306 for the selected property listing can be determined and presented in a mortgage window 308 (see FIG. 8B). The determination of the mortgage terms 306 may be based on (amongst other things) a prior specification of acceptable financial terms by a user (say, via the financial profile window 210).

Thereafter, one or more additional property listings 320 (see FIG. 8C) can be automatically presented (or at least made available for presentation) based on (amongst other things) the mortgage terms determined for the selected property listing. The additional listings 320 may be presented, for example, in an additional listings window 318, which may be prompted by a user by selecting an "additional listings" button 316 provided with the mortgage window 308. Alternatively, the additional listings may be provided as updates or alerts, such as where the MRDMP system 100 transmits periodic electronic messages alerting the user to newly-available listings that may be purchased on terms consistent with those established for the selected listing 304a. The additional property listings 320 could be chosen due to a perceived similarity between the financial characteristics associated with the additional listings and those for the selected listing 304a (e.g., the selected and additional listings are respectively associated with similar monthly payments or with similar calculated total costs of ownership).

In some embodiments, the user may provide an indication of satisfaction with or disapproval of the determined mortgage terms, for example, by clicking (or refraining from clicking) an approval box 322 associated with respective mortgage terms 306. Additional property listings 320 may then be presented that are associated with mortgage terms corresponding only to terms approved in conjunction with the selected property listing 304a.

Figure 11:

Referring to FIGS. 9-11, a mortgage window 408 may present one or more mortgage scenarios 406 regarding a selected property listing 404a, which mortgage scenarios may be automatically obtained, such as by automatically retrieving the scenarios from a loan provider and/or by drawing the scenarios from a lookup table. The user may also be provided with the option of entering financial terms corresponding to a separately-obtained mortgage scenario regarding the selected property listing 404a, as might be obtained where the user contacts lenders off-line to inquire about special rates or deals. The mortgage window 408 may include an "add an offer" button 440 that prompts an independent offer window 450. Once the user has entered the terms of the separately-obtained mortgage scenario, the MRDMP system-obtained mortgage scenarios 406 and the separately-obtained mortgage scenarios 406a may be presented together, for example, in a table listing the primary financial terms of the various scenarios, in order to allow comparisons therebetween.

Figure 12:
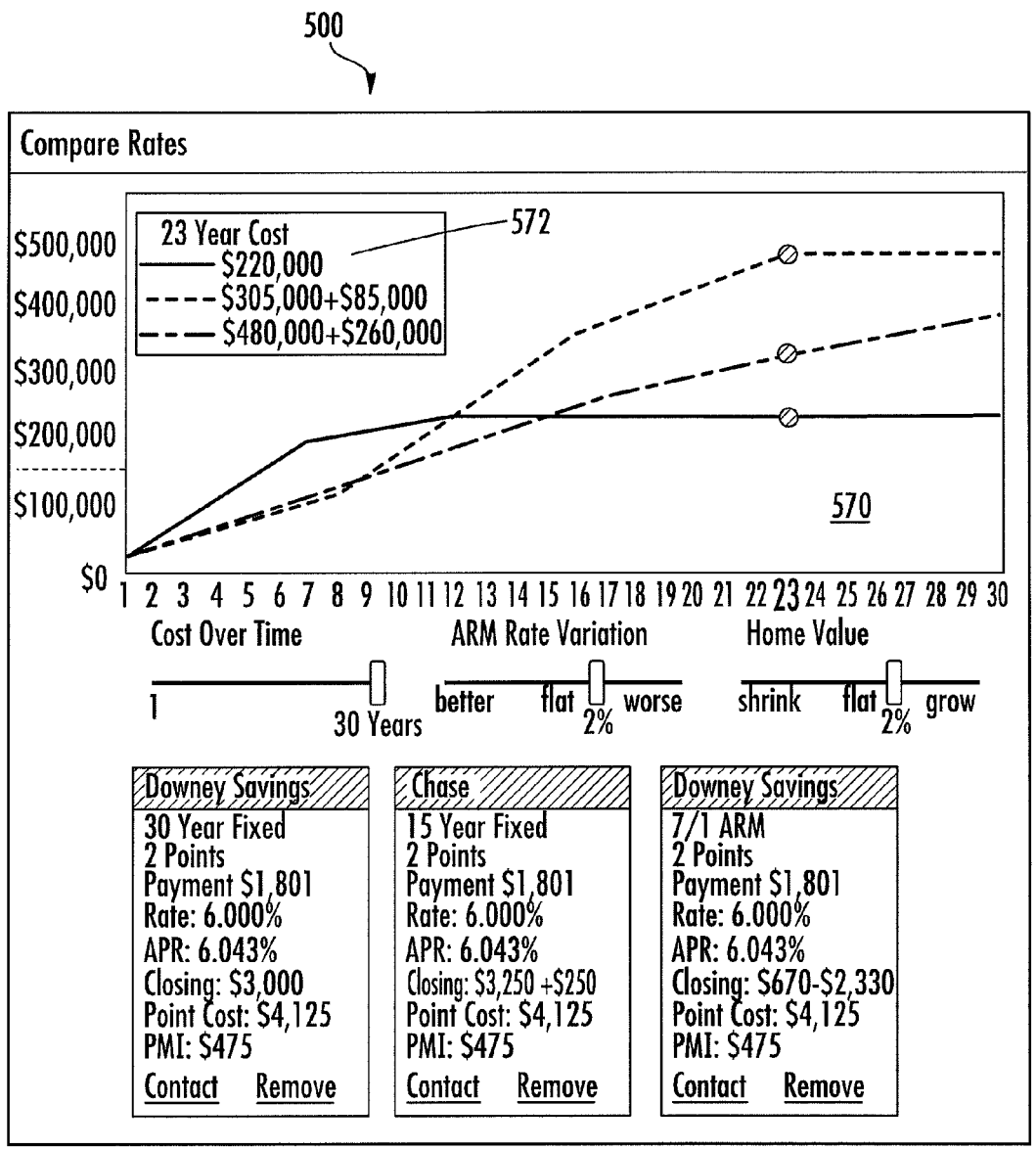
FIG. 12 is a schematic representation of a scenario plot window configured in accordance with an example embodiment.

Referring to FIGS. 11 and 12, the mortgage window 408 may include "compare" buttons 460 corresponding to each of the presented mortgage scenarios 406, 406a. Activating a respective compare button 460 allows for the associated scenario to be graphically presented via a graph 570 provided in a scenario plot window 500. The scenarios may be presented to display any of a variety of financial characteristics as a function of time, including, for example, the total cumulative loan cost as a function of time, the instantaneous interest rate of the loan, and/or the total cumulative cost of ownership.

The scenario plot window 500 may allow various mortgage scenarios to be visually compared by a user, thereby facilitating a choice between several options. In some embodiments, a user may select a position within the graph 570 in order to prompt a report 572 of one or more financial terms of each of the multiple graphically-presented mortgage scenarios corresponding to the selected position. For example, the MRDMP system may plot the cumulative cost of each respective mortgage as a function of time. A selection of a time within the graph 570, say, a choice of the 23-year mark, as shown in FIG. 12, would then result in a report 572 of the loan costs accrued up until that time. Regardless of the type of plot presented, a variety of financial information can be presented in the report 572 as a function of a selected time, including a monthly payment, an amount of interest paid, an amount of equity built, and/or an interest rate corresponding to the position.

Referring again to FIGS. 1 and 6, the MRDMP system 100 may be configured to monitor, perhaps automatically, prevailing or specific market conditions in order to inform users of changes that affect the compatibility of properties with user specified criteria. For example, a user may indicate an acceptable mortgage term (e.g., a maximum acceptable monthly mortgage payment, a maximum acceptable total cost of ownership, etc.) via the financial profile window 210. Thereafter, a financial index or indices (e.g., mortgage interest rates offered by specific lenders and/or national interest rate indices), or one or more specific mortgage offers, may be automatically monitored. The processing unit 102 may be configured to access, say, via the Internet, the web sites associated with one or more lenders in order to obtain interest rate data and catalogue existing loan offers. A set of specific properties can be automatically selected from a database of property listings (e.g., stored in the database 112 or in the memory device 108), the selections being based on the user's indication of the acceptable mortgage term and the monitored financial index or offer (and also possibly on the user's financial profile and any indications of user geographic preference).

As an example, a user may specify an acceptable monthly payment amount (again, say, via the financial profile window 210), and may be presented with a list of properties consistent with that criterion. Later, properties previously inconsistent with the user's criterion, that is, associated with a monthly payment above the "acceptable" payment, may become compatible with the criterion (i.e., may later be associated with a lower monthly payment that is less than the "acceptable" amount), for example, due to a drop in interest rates. The MRDMP system can then accumulate a second set of properties consistent with the "acceptable" payment, the second set now capturing the newly-compatible properties. The second set can be automatically compared the prior set of specific properties to determine differences therebetween, and the user can be presented with any added or modified properties. Users may be presented with automated alerts informing of newly-available properties consistent with user criteria, of properties for which financial characteristics have changed so as to now be consistent with user criteria, and or properties for which financial characteristics have changed so as to now be inconsistent with user criteria.

In monitoring, the MRDMP system 100 may be configured to periodically present to the user updated representations of the monitored financial index or specific mortgage offer. For example, the system may provide periodic email alerts to the user regarding the interest rate and required down payment for a specific mortgage offer. Alternatively, the system 100 may provide a continuous display of such monitored values, similar to a stock ticker.

In addition to aiding a user in locating properties of potential interest and aggregating financial data related to financing the purchase or lease of the properties, the MRDMP system may also be configured to guide users through the process of obtaining financing. For example, referring to FIGS. 1, 2A, 13, and 14, property listings 204 may be presented in a listing window 202, with each listing being accompanied by a "save this listing" button 203. By activating the save this listing button 203, the associated property listing 204 can be stored, for example, in the memory device 108. Any mortgage scenarios that may have been accumulated regarding the saved property listing can also be saved with the listing. Thereafter, users can access the saved listings and associated mortgage scenarios, for example, from a saved listings window 600. The saved listings window 600 can display summary information for all of the saved property listings 604 associated with a user.

Clicking on one of the saved listings 604 may prompt a notebook view 700. The notebook view 700 can display listing data 704, mortgage offers 706 (both MRDMP-obtained and separately-obtained) and associated comparison data 707, and/or financial information 710. Within the notebook view 700, various mortgage offers 706 obtained for a property listing can be compared. The notebook view 700 may also provide educational materials regarding the mortgage process, ratings and reviews of various loan providers, and links to further information.

Selecting a specific offer 706a, for example, by clicking on the offer with a mouse, may initiate a specific offer window 800. The specific offer window 800 can provide further details regarding a specific offer 706a, and may provide a note area 762 within which a user may record notes. Contact information 764 for the loan provider associated with the specific offer 706a may also be provided, thereby facilitating contact between the loan provider and the user. Topics for further discussion and suggested questions 766 related to the offer at issue 706a may be listed along with areas 768 to record answers from the loan provider and user notes thereon.

In some embodiments, the topics/questions 766 would be tailored to the type of loan being considered. For example, a user may be presented with a variable rate mortgage, and the suggested questions could relate to aspects of the variable rate mortgage, such as "how will the rate be adjusted over time?"

The MRDMP system may store all of the information contained in the notebook view 700 (including the information contained in the specific offer window 800) together in order to create a central repository for information related to the potential purchase of a property. This repository can be revisited and supplemented over time in order to create a complete record of the potential transaction. The aggregation of mortgage and property data in one location may facilitate the purchase process.

As described above and as will be appreciated by one skilled in the art, embodiments of the present invention may be configured as a system, an apparatus, or a method. Accordingly, embodiments of the present invention may be comprised of various means including entirely of hardware, entirely of software, or any combination of hardware and software. Furthermore, embodiments of the present invention may take the form of a computer program product including a computer-readable storage medium having computer-readable program instructions (e.g., computer software) embodied in the storage medium, e.g., memory device 108. Any suitable computer-readable storage medium may be utilized including non-volatile memory such as hard disks, CD-ROMs, optical storage devices, or magnetic storage devices.

Embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus, such as processing device 102, to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed:

1. A method of managing real estate data comprising:
receiving an indication from a user via a graphical user interface in communication with a processor of one or more acceptable mortgage terms, the mortgage terms comprising one or more of a monthly payment or a total cost of ownership;
automatically monitoring a financial index or a specific mortgage offer;
automatically selecting, via the processor, a first set of one or more specific properties from a database of property listings based at least on the indication of the one or more acceptable mortgage terms and the monitored financial index or specific mortgage offer;
detecting, via the processor, a change in the monitored financial index or specific mortgage offer; and
in response to detecting the change, automatically selecting, via the processor, a second set of one or more specific properties from the database of property listings based at least on the indication of the one or more acceptable mortgage terms and the changed financial index or specific mortgage offer.

2. A method according to claim 1, further comprising automatically presenting periodically to the user respective current representations of the monitored financial index or specific mortgage offer.

3. A method according to claim 2, wherein said automatically presenting periodically to the user respective representations of the monitored financial index or specific mortgage offer includes automatically presenting periodically to the user the interest rate and required down payment for a monitored specific mortgage offer.

4. A method according to claim 1, further comprising:
automatically comparing the second set of specific properties to the first set of specific properties to determine differences therebetween; and
providing a representation of the determined differences between the second set of specific properties and the first set of specific properties.

5. A method according to claim 1, further comprising obtaining a financial profile for the user and wherein said automatically selecting the first and second sets of one or more specific properties from the database of property listings is further based on the financial profile.

6. A method according to claim 5, wherein said obtaining a financial profile for the user includes obtaining one or more items selected from the group consisting of loan type preferences, user income, user credit score, estimated down payment, and intended points to be paid.

7. A method according to claim 1, wherein said automatically monitoring the financial index or specific mortgage offer includes automatically monitoring one or more items selected from the group consisting of mortgage interest rates offered by specific lenders and interest rate indices.

8. A method according to claim 1, further comprising receiving indication from a user of a geographic location, and wherein said automatically selecting the first and second sets of one or more specific properties from the database of property listings based at least on the indication of the acceptable mortgage term and the monitored financial index or specific mortgage offer includes automatically selecting the first and second sets of one or more specific properties from a database of property listings based at least on the indication of the geographic location.

9. A non-transitory computer-readable storage medium that stores computer-readable instructions that, when executed by a computer, cause the computer to carry out a method including:
receiving an indication from a user via a graphical user interface in communication with a processor of one or more acceptable mortgage terms, the mortgage terms comprising one or more of a monthly payment or a total cost of ownership;
automatically monitoring a financial index or a specific mortgage offer;
automatically selecting a first set of one or more specific properties from a database of property listings based at least on the indication of the one or more acceptable mortgage terms and the monitored financial index or specific mortgage offer;
detecting a change in the monitored financial index or specific mortgage offer; and
in response to detecting the change, automatically selecting a second set of one or more specific properties from the database of property listings based at least on the indication of the one or more acceptable mortgage terms and the changed financial index or a specific mortgage offer.

10. A computer-readable storage medium according to claim 9, wherein said computer-readable storage medium stores computer-readable instructions that, when executed by a computer, cause the computer to carry out a method further comprising:
automatically comparing the second set of specific properties to the first set of specific properties to determine differences therebetween; and
providing a representation of the determined differences between the second set of specific properties to the first set of specific properties.

11. A computer-readable storage medium according to claim 9, wherein said computer-readable storage medium stores computer-readable instructions that, when executed by a computer, cause the computer to obtain a financial profile for the user, and wherein said automatically selecting the first and second sets of one or more specific properties from the database of property listings is further based on the financial profile.

12. A computer-readable storage medium according to claim 9, wherein said automatically monitoring the financial index or specific mortgage offer includes automatically monitoring one or more items selected from the group consisting of mortgage interest rates offered by specific lenders and interest rate indices.

13. A computer-readable storage medium according to claim 9, wherein said computer-readable storage medium stores computer-readable instructions that, when executed by a computer, cause the computer to receive indication from a user of a geographic location, and wherein said automatically selecting the first and second sets of one or more specific properties from the database of property listings based at least on the indication of the acceptable mortgage term and the monitored financial index or specific mortgage offer includes automatically selecting the first and second sets of one or more specific properties from the database of property listings based at least on the indication of the geographic location.

14. An apparatus comprising a processing unit and a memory storing computer program instructions, the memory and computer program instructions being configured to, with the processing unit, cause the apparatus to at least:

receive an indication from a user via a graphical user interface in communication with a processor of one or more acceptable mortgage terms, the mortgage terms comprising one or more of a monthly payment or a total cost of ownership;

automatically monitor a financial index or a specific mortgage offer;

automatically select a first set of one or more specific properties from a database of property listings based at least on the indication of the one or more acceptable mortgage terms and the monitored financial index or specific mortgage offer;

detect a change in the monitored financial index or specific mortgage offer; and in response to detecting the change, automatically select a second set of one or more specific properties from the database of property listings based at least on the indication of the one or more acceptable mortgage terms and the changed financial index or a specific mortgage offer.

15. The apparatus of claim 14, wherein the apparatus is further caused to:

automatically compare the second set of specific properties to the first set of specific properties to determine differences therebetween; and provide a representation of the determined differences between the second set of specific properties and the first set of specific properties.

16. The apparatus of claim 14, wherein the apparatus is further caused to obtain a financial profile for the user, and wherein the apparatus is caused to automatically select the first and second sets of one or more specific properties from the database of property listings further based on the financial profile.

17. The apparatus of claim 14, wherein the apparatus is caused to automatically monitor the financial index or specific mortgage offer by automatically monitoring one or more of mortgage interest rates offered by specific lenders or interest rate indices.

18. The apparatus of claim 14, wherein the apparatus is further caused to receive indication from a user of a geographic location, and wherein the apparatus is caused to automatically select the first and second sets of one or more specific properties from the database of property listings further based on geographic location.

* * * * *

UNITED STATES PATENT AND TRADEMARK OFFICE
CERTIFICATE OF CORRECTION

| | | |
|---|---|---|
| PATENT NO. | : 8,315,911 B2 | Page 1 of 1 |
| APPLICATION NO. | : 12/553456 | |
| DATED | : November 20, 2012 | |
| INVENTOR(S) | : Callow et al. | |

It is certified that error appears in the above-identified patent and that said Letters Patent is hereby corrected as shown below:

In the Claims:

Column 13

In Claim 1, Line 5, "A method of managing real estate data comprising" should read
--A method comprising--

Signed and Sealed this
Twenty-first Day of May, 2013

Teresa Stanek Rea
*Acting Director of the United States Patent and Trademark Office*